United States Patent
Anderson et al.

(10) Patent No.: US 9,032,886 B2
(45) Date of Patent: May 19, 2015

(54) INDEPENDENT SUSPENSION FOR CLOSING DISCS OF AN AGRICULTURAL ROW UNIT CLOSING ASSEMBLY

(71) Applicant: CNH America LLC, New Holland, PA (US)

(72) Inventors: Brian J. Anderson, Yorkville, IL (US); Johnathon R. Dienst, DeKalb, IL (US)

(73) Assignee: CNH Industrial America LLC, New Holland, PA (US)

(*) Notice: Subject to any disclaimer, the term of this patent is extended or adjusted under 35 U.S.C. 154(b) by 120 days.

(21) Appl. No.: 13/737,548

(22) Filed: Jan. 9, 2013

(65) Prior Publication Data

US 2014/0190382 A1 Jul. 10, 2014

(51) Int. Cl.
*A01C 5/06* (2006.01)

(52) U.S. Cl.
CPC .............. *A01C 5/066* (2013.01); *Y10S 111/926* (2013.01)

(58) Field of Classification Search
CPC .......... A01C 5/066; A01C 5/068; A01C 5/06; A01C 5/00
USPC ...................... 111/190–196, 926, 927, 52–81, 111/134–137
See application file for complete search history.

(56) References Cited

U.S. PATENT DOCUMENTS

| | | |
|---|---|---|
| 3,157,139 A | 11/1964 | Spindler |
| 4,009,668 A | 3/1977 | Brass et al. |
| 4,214,537 A | 7/1980 | Bailey et al. |
| 4,275,670 A | 6/1981 | Dreyer |
| 4,404,918 A | 9/1983 | Whalen et al. |
| 4,579,071 A | 4/1986 | Johnson |
| 5,074,227 A | 12/1991 | Schwitters |
| 5,080,178 A | 1/1992 | Dietrich, Sr. |
| 5,165,351 A | 11/1992 | Billings |
| 5,235,922 A | 8/1993 | Deckler |
| 5,461,995 A | 10/1995 | Winterton |
| 5,595,130 A | 1/1997 | Baugher et al. |
| 5,595,249 A | 1/1997 | Steinberger et al. |
| 5,623,997 A | 4/1997 | Rawson et al. |
| 5,809,915 A | 9/1998 | Jess et al. |
| 6,148,747 A | 11/2000 | Deckler et al. |
| 6,213,220 B1 | 4/2001 | Heckendorf |
| 6,314,897 B1 | 11/2001 | Hagny |
| 6,530,334 B2 | 3/2003 | Hagny |
| 6,578,640 B1 | 6/2003 | Ohlman et al. |
| 6,880,644 B2 | 4/2005 | Weast et al. |

(Continued)

FOREIGN PATENT DOCUMENTS

| | | |
|---|---|---|
| CA | 2553307 | 1/2008 |
| EP | 1332655 | 8/2003 |

(Continued)

OTHER PUBLICATIONS

PCT International Search Report and Written Opinion dated Feb. 27, 2014.

*Primary Examiner* — Christopher J Nonosad
(74) *Attorney, Agent, or Firm* — Rebecca L. Henkel

(57) ABSTRACT

One closing assembly of a row unit for an agricultural implement includes a frame configured to support ground-working tools of the row unit. Multiple arms are coupled to the frame, each arm of the multiple arms being independently rotatable about a common axis. Each arm is configured to be coupled to a closing disc configured to direct soil into a trench.

11 Claims, 4 Drawing Sheets

(56) References Cited

U.S. PATENT DOCUMENTS

| | | | |
|---|---|---|---|
| RE38,974 E | 2/2006 | Gengler et al. |
| 7,044,070 B2 | 5/2006 | Kaster et al. |
| 7,191,715 B2 | 3/2007 | Wendte et al. |
| 7,410,005 B2 | 8/2008 | Lung et al. |
| 7,581,503 B2 | 9/2009 | Martin et al. |
| 7,631,607 B2 | 12/2009 | Vandersnick |
| 8,006,775 B2 | 8/2011 | Steinlage et al. |
| 8,047,301 B2 | 11/2011 | Friggstad et al. |
| 8,393,407 B2 | 3/2013 | Freed |
| 8,863,857 B2 | 10/2014 | Bassett |
| 2004/0149186 A1 | 8/2004 | Stark et al. |
| 2005/0072344 A1 | 4/2005 | Kester |
| 2008/0023207 A1 | 1/2008 | Lung et al. |
| 2009/0025619 A1 | 1/2009 | Vandersnick |
| 2012/0255475 A1 | 10/2012 | Mariman et al. |
| 2013/0206431 A1 | 8/2013 | Freed |
| 2014/0190382 A1 | 7/2014 | Anderson et al. |
| 2014/0224513 A1 | 8/2014 | Van Buskirk et al. |

FOREIGN PATENT DOCUMENTS

| | | |
|---|---|---|
| EP | 1616467 | 1/2006 |
| EP | 2018799 | 1/2009 |
| EP | 2510768 | 10/2012 |
| WO | 96/24239 | 8/1996 |
| WO | 0074464 | 12/2000 |
| WO | 2009/032829 | 3/2009 |
| WO | 2011/0129916 | 10/2011 |
| WO | 2014051507 | 4/2014 |
| WO | 2014066650 | 5/2014 |
| WO | 2014101908 | 7/2014 |

INDEPENDENT SUSPENSION FOR CLOSING DISCS OF AN AGRICULTURAL ROW UNIT CLOSING ASSEMBLY

BACKGROUND

The invention relates generally to ground working equipment, such as agricultural equipment, and more specifically, to an independent suspension for closing discs of a row unit closing assembly.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench (e.g., furrow) into the soil, and seeds are deposited into the trench. In certain row units, the opener is followed by a set of closing discs that direct the soil back into the trench and/or a packer wheel that packs the soil on top of the deposited seeds.

The closing discs, usually in a paired configuration, are disposed on either side of the trench and direct soil into the trench to cover deposited seeds with the soil. Typically, the closing disc configuration is such that both of the closing discs react together to uneven surfaces on either side of the trench. Uneven surfaces may be caused by rocks, plant matter, non-uniform soil distribution, or other ground discontinuities. For example, if a right closing disc is displaced by a rock, a left closing disc is also displaced. Accordingly, the disruptions in the soil may negatively affect the manner in which soil is directed into the trench, resulting in uneven seed covering. This may cause non-optimal growing conditions for the seeds, which may reduce overall yield and profit for farmers.

BRIEF DESCRIPTION

In one embodiment, a closing assembly of a row unit for an agricultural implement includes a frame configured to support ground-working tools of the row unit. Multiple arms are coupled to the frame, each arm of the multiple arms being independently rotatable about a common axis. Each arm is configured to be coupled to a closing disc configured to direct soil into a trench.

In another embodiment, a closing assembly for a row unit for an agricultural implement includes a frame configured to support ground-working tools of the row unit. A pair of arms is coupled to the frame, each of the plurality of arms being independently rotatable about a common axis. A pair of closing discs is configured to direct soil into a trench, each closing disc of the pair of closing discs is coupled to a respective one of the pair of arms. A pair of coil springs is configured to exert a force on each respective arm, the force exerted by each coil spring urges each respective closing disc toward a soil surface.

In a further embodiment, a closing assembly for a row unit for an agricultural implement includes a frame configured to support ground-working tools of the row unit. A pair of arms is coupled to the frame, each arm of the plurality of arms being independently rotatable about a common axis. A pair of closing discs is configured to direct soil into a trench, each closing disc of the pair of closing discs being coupled to a respective one of the pair of arms. A bolt extends through the frame and the pair of arms to couple the pair of arms to the frame, and the bolt forms the common axis.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
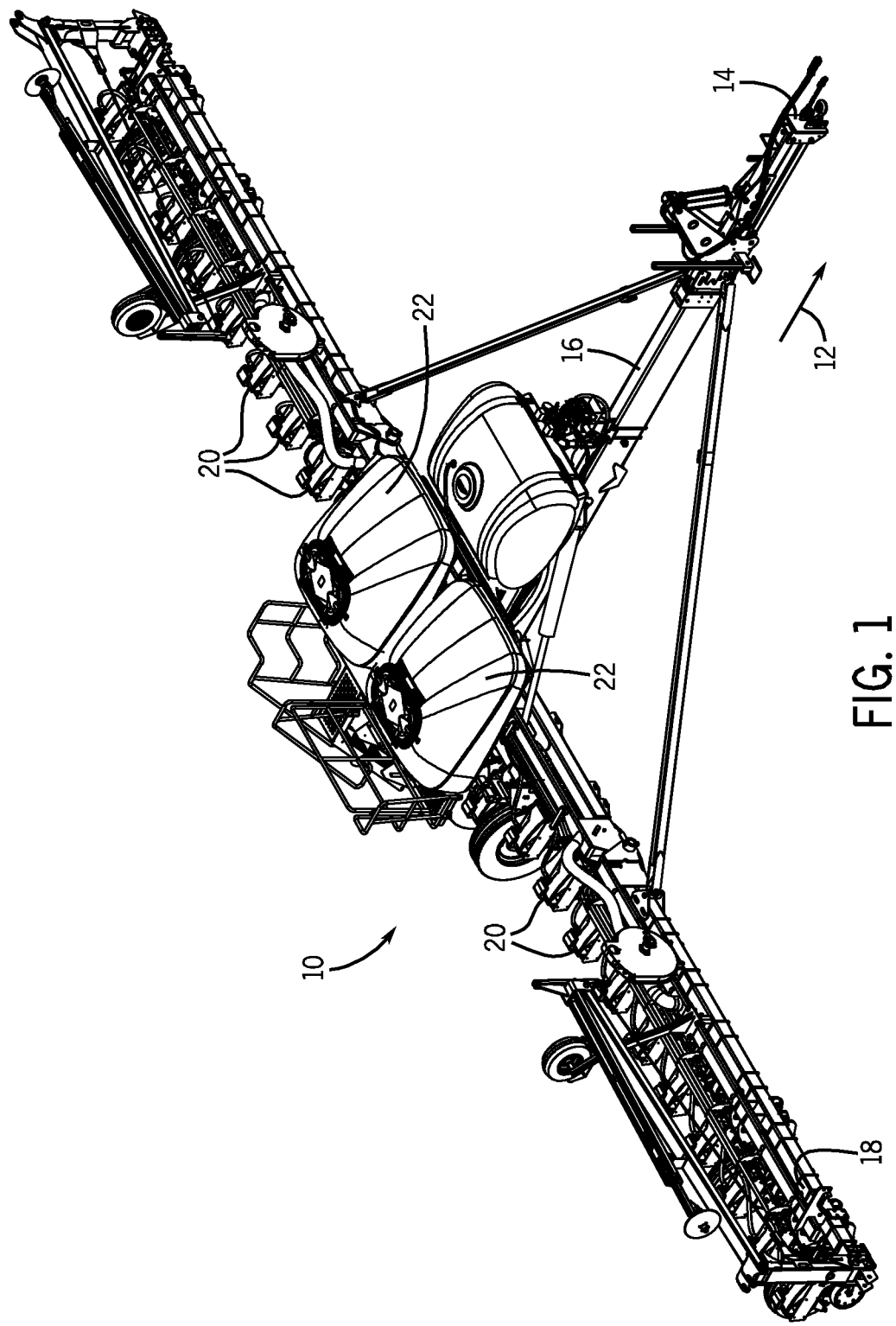
FIG. 1 is a perspective view of an embodiment of an agricultural implement configured to deposit seeds into a soil surface.

FIG. 1 is a perspective view of an embodiment of an agricultural implement 10 configured to deposit seeds into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit seeds at a desired depth beneath the soil surface, thereby establishing rows of planted seeds. The implement 10 also includes seed tanks 22, and a pneumatic distribution system configured to convey seeds from the tanks to the row units 20. In certain embodiments, the pneumatic distribution system includes an inductor box positioned beneath each seed tank 22. Each inductor box is configured to receive seeds from a respective tank, to fluidize the seeds into an air/seed mixture, and to distribute the air/seed mixture to the row units 20 via a network of pneumatic hoses/conduits.

In certain embodiments, each row unit 20 includes a residue manager, an opening assembly, a seed tube, a closing assembly, and a press wheel. The residue manager includes a rotating wheel having multiple tillage points or fingers that break up crop residue, thereby preparing the soil for seed deposition. The opening assembly includes a gauge wheel and an opener disc. The gauge wheel may be positioned a vertical distance above the opener disc to establish a desired trench depth for seed deposition into the soil. The closing assembly includes a pair of closing discs. As the row unit travels across a field, the opener disc excavates a trench into the soil for seed deposition. The seed tube, which may be positioned behind the opening assembly, directs a seed from a metering system into the excavated trench. The closing discs then direct the excavated soil into the trench to cover the planted seed. Finally, the press wheel packs the soil on top of the seed with a desired pressure.

While the illustrated implement 10 includes 24 row units 20, it should be appreciated that alternative implements may include more or fewer row units 20. For example, certain implements 10 may include 4 to 54 row units, or more. In addition, the spacing between row units may be particularly selected based on the type of crop being planted. For example, the row units 20 may be spaced 30 inches from one another for planting corn, and 15 inches from one another for planting soy beans.

As previously mentioned, each of the row units 20 may include a closing assembly having a pair of closing discs that directs the soil over the seeds deposited within the trench created by the opening assembly. To reduce the possibility that disruptions in the soil (e.g., plant matter, rocks, clay, etc.) on one side of the trench may displace both of the closing discs, the closing discs may be suspended separately from the row unit 20, and independently from one another. In this way, a displacement of the closing disc on one side of the trench may not displace the closing disc on the other side of the trench. As a result, the uniformity of the soil along the trench may be enhanced, thereby resulting in more even plant growth and greater crop yield.

Figure 2:
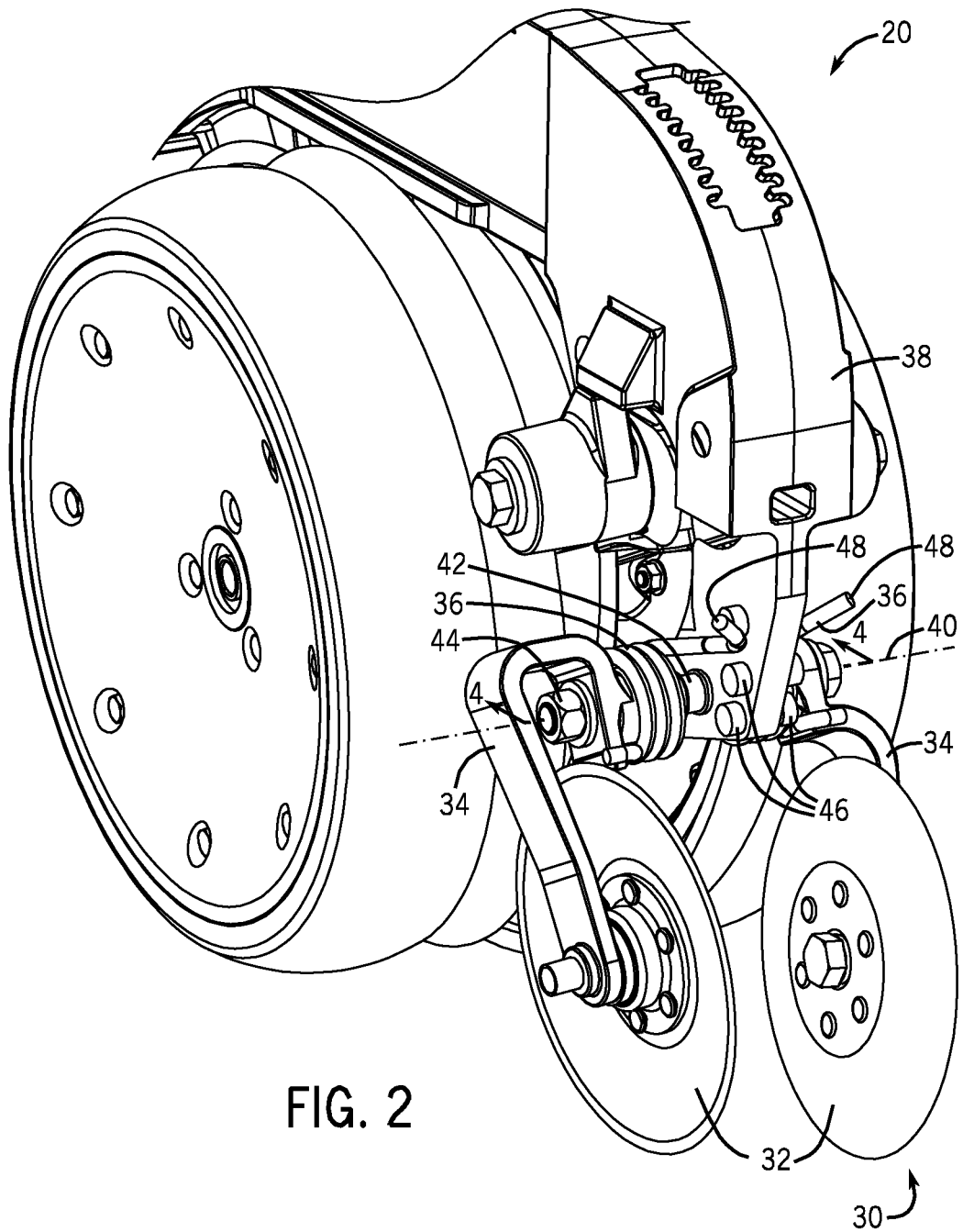
FIG. 2 is a perspective view of an embodiment of a closing assembly of a row unit of the agricultural implement of FIG. 1.

FIG. 2 is a perspective view of an embodiment of a closing assembly 30 of the row unit 20 of the agricultural implement 10 of FIG. 1. Particularly, the closing assembly 30 mounts to each row unit 20 of the agricultural implement 10. Each closing assembly 30 includes multiple closing discs 32, multiple arms 34, and multiple coil springs 36, each attached to a frame 38 (e.g., backbone). In the illustrated embodiment, the closing assembly 30 includes two closing discs 32, two arms 34, and two coil springs 36. The arms 34 and the coil springs 36 cooperate to independently suspend each closing disc 32 from one another.

Each closing disc 32 is coupled to the frame 38 via an arm 34. As depicted, each arm 34 is located laterally outward from the frame 38, such that the closing discs 32 are generally aligned with the direction of travel 12 of the agricultural implement 10. Although the arms 34 are physically independent of one another, they share a common rotational axis 40, about which the arms 34 are independently rotatable. Enabling the arms 34 to rotate independently may improve the efficiency with which the closing discs 32 recover soil and direct the soil into a trench. A bolt 42 is aligned with and extends through both arms 34 and the frame 38 to form the axis 40. In the depicted embodiment, the bolt 42 has a head on one end and threads for a nut 44 on the other end. The bolt and nut secure the arms 34 in a position adjacent to the frame 38. In other embodiments, the bolt 42 may be replaced with other suitable connectors such as a pin, rod, axle, etc.

A force applied to each arm 34 by the coil spring 36 urges the closing disc 32 into the soil. In this way, the closing discs 32 may apply force to the soil to funnel the soil over the seeds disposed in a trench. It may be desirable to adjust a magnitude of the force the coil springs 36 transfer to the closing discs 32 based on various conditions, such as a trench depth, a soil density, a soil saturation, etc. Accordingly, in the depicted embodiment, a set of pegs 46 is disposed on each lateral side of the frame 38. The coil springs 36 each include an extension 48 that is positioned under one of the pegs 46 to set the magnitude of force provided by the coil spring 36. Thus, the position of the extension 48 among the pegs 46 may be adjusted to control the magnitude of the force applied to each of the closing discs 32. Further, each coil spring 36 may be set to a different peg 46, thereby providing different forces to each of the closing discs 32. The extension 48 may be disposed behind any peg 46 manually by an operator, thereby obviating tools for providing the adjustment and simplifying the force selection for the closing discs 32. As depicted, the frame 38 includes a set of three pegs 46 to provide three force settings for the closing discs 32; however, in alternative embodiments, more or fewer pegs 46 may be disposed on the frame 38.

The use of the adjustable coil springs 36 and the independent arms 34 may enable each closing disc 34 of the multiple closing discs 34 to rotate independently about the common axis 40. In this way, each closing disc 34 may react to discontinuities in the soil independently. Further, the coil springs 36 with adjustable peg 46 positions enable the operator to adapt the closing assembly 30 to current planting conditions.

Figure 3:
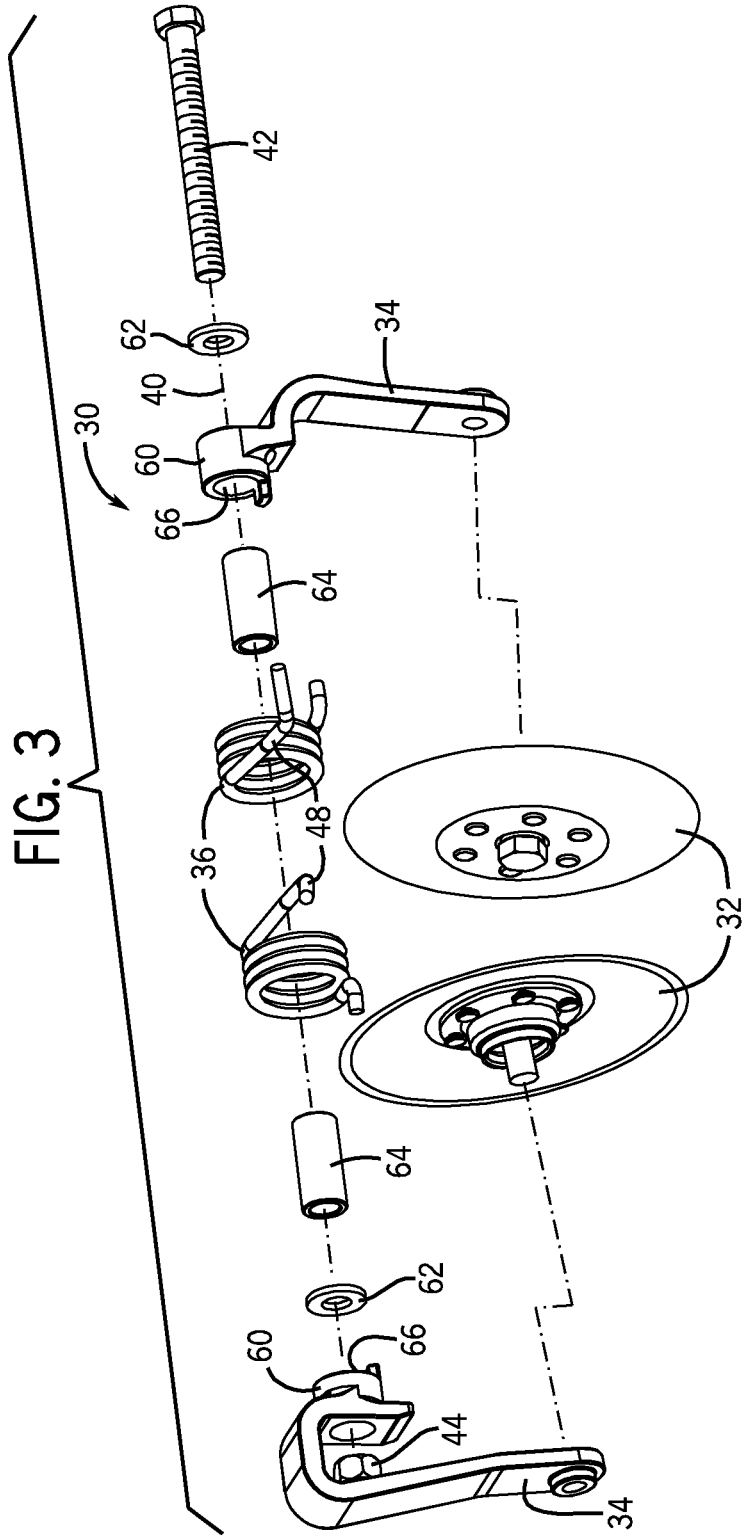
FIG. 3 is an exploded view of the closing assembly of FIG. 2.

FIG. 3 is an exploded view of the closing assembly 30 of FIG. 2. As shown, the bolt 42 with the nut 44 at one end extends along the common axis 40, and the arms 34 and the coil springs 36 rotate about the common axis 40. An end 60 of each arm 34 is disposed about the bolt 42, enabling the arms 34 to rotate about the bolt 42. The coil springs 36 are also disposed about the bolt 42. As the arms 34 are independent of one another and the coil springs 36 are independent of one another, the associated closing discs 32 may operate independently of one another.

Additional components may be included along the bolt 42 to improve the operation of the closing assembly 30. For example, multiple washers 62 and spacers 64 are disposed about the bolt 42 to provide proper spacing and/or wear-resistance between the arms 34, the coil springs 36, the bolt 42, and the nut 44. Particularly, the washers 62 may reduce friction between one arm 34 and the head of the bolt 42 and between the other arm 34 and the nut 44. The spacers 64 are arranged between the bolt 42 and a rotational interface 66 of the arms 34 to reduce friction, to improve wear-resistance, and to locate the arms 34 at a desirable position along the common axis 40. In certain embodiments, a length of the spacers 64 may be adjusted to control a distance between the closing discs 32.

Figure 4:
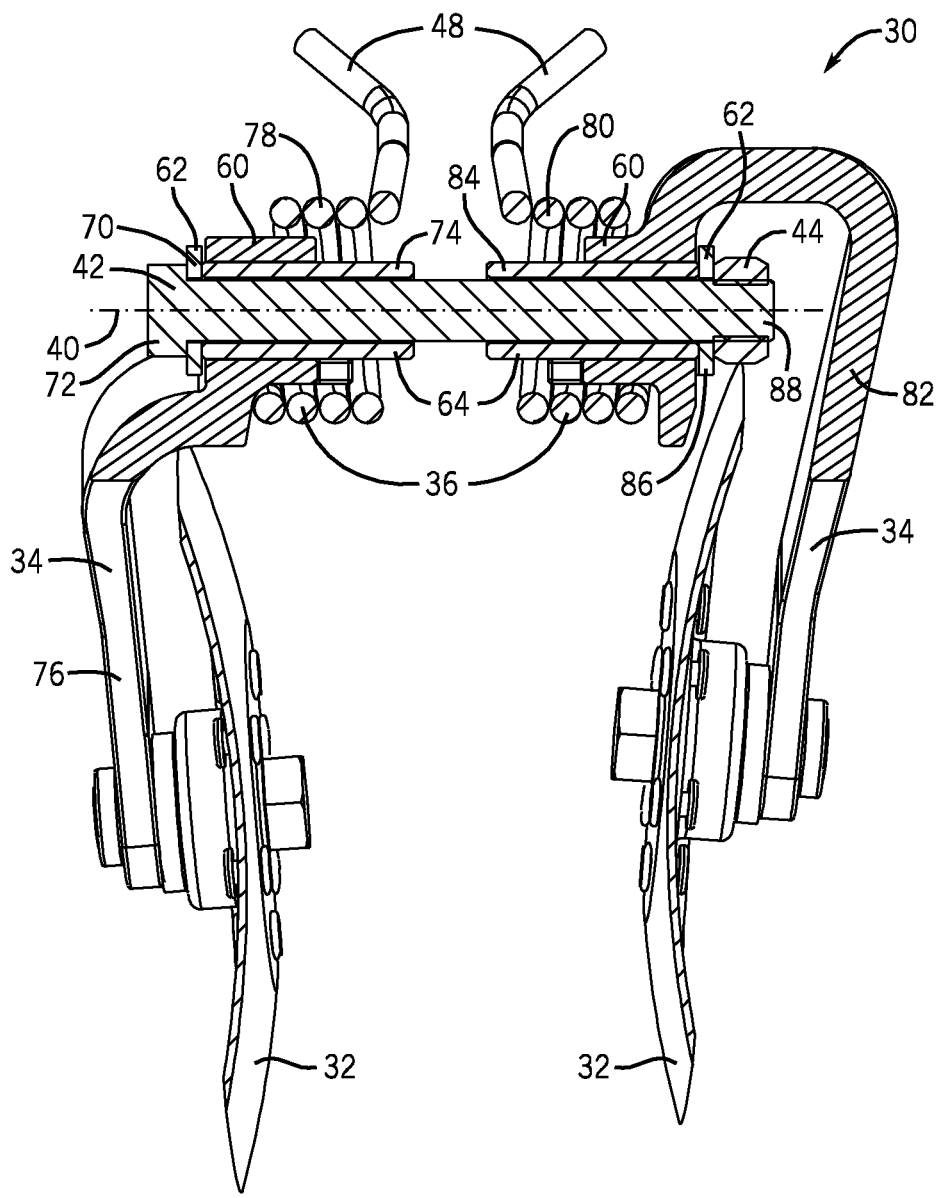
FIG. 4 is a cross-sectional view of the closing assembly, taken along line 4-4.

FIG. 4 is a cross-sectional view of the closing assembly 30 of FIG. 2, taken along line 4-4. The line 4-4 bisects the bolt 42 in a vertical plane. FIG. 4 illustrates how the components (e.g., the arms 34, the springs 36, the washers 62, and the spacers 64) fit along the bolt 42. As shown, a first washer 70 is disposed against a head 72 of the bolt 42 and retained by the head 72 of the bolt 42. A first spacer 74 is positioned directly adjacent to the first washer 70. A rotational interface of a first arm 76 is disposed about the spacer 74 and directly adjacent to the first washer 70. A first coil spring 78 is positioned about the bolt 42, and the bolt 42 extends through an opening in the frame 38. The other end of the bolt 42 may mirror the first end (e.g., the arrangement of a second coil spring 80, a second arm 82, a second spacer 84, and a second washer 86 may mirror the arrangement of the first coil spring 78, the first arm 76, the first spacer 74, and the first washer 70). The entire assembly may be fixed into position by coupling the nut 44 to an end 88 of the bolt 42 opposite the head 72. The extensions 48 of the coil springs 36 may be disposed behind one of the pegs 46 to urge to the closing discs 32. As previously mentioned, the coil springs 36 may provide independent suspension and tension to each arm 34, and therefore, to each closing disc 32.

As previously mentioned, each of the row units 20 of an agricultural implement 10 may include a closing assembly 30. Once an opening assembly creates a trench and seeds are deposited within the trench, the closing assembly 30 may use a pair of closing discs 32 to direct the soil over the seeds. It may be particularly advantageous to evenly cover the seeds with soil. Thus, to reduce disruptions in the soil (e.g., plant matter, rocks, clay, etc.) on one side of the trench from displacing both of the closing discs 32, the closing discs 32 may be suspended separately from the row unit 20 via adjustable coil springs 36. Further, the closing discs 32 may be independently suspended from one another. In this way, a displacement of the closing disc 32 on one side of the trench will not also displace the closing disc 32 on the other side of the trench. This may enable improved soil coverage of the seeds in the trench, resulting in more even plant growth and greater crop yield. The use of the adjustable coil springs 36 and the independent arms 34 may enable each closing disc 34 of the multiple closing discs 34 to rotate independently about a common axis 40 created by a bolt 42. In this way, each closing disc 34 may react to any discontinuities in the soil independently. Further, the coil springs 36 may have adjustable peg 46 positions that enable the operator to adapt the magnitude of the force supplied to the closing discs with respect to current planting conditions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A closing assembly of a row unit for an agricultural implement, comprising:
   a frame configured to support ground-working tools of the row unit;
   a plurality of arms coupled to the frame, wherein each arm of the plurality of arms is independently rotatable about a common axis, and each arm is configured to be coupled to a closing disc configured to direct soil into a trench;
   a bolt configured to couple the plurality of arms to the frame, wherein the bolt extends along the common axis, the bolt extends through an opening in an end of each respective arm of the plurality of arms, and each arm of the plurality of arms is rotatable about the bolt; and
   a plurality of coil springs, wherein each coil spring of the plurality of coil springs is configured to urge a respective closing disc toward a soil surface, and each coil spring extends about the bolt and the end of a respective arm of the plurality of arms.

2. The closing assembly of claim 1, wherein a magnitude of a force applied by each coil spring is adjustable.

3. The closing assembly of claim 2, comprising a plurality of pegs disposed on the frame and configured to facilitate adjustment of the magnitude of the force.

4. The closing assembly of claim 1, comprising two closing discs, and the two closing discs are arranged on opposite lateral sides of the frame.

5. The closing assembly of claim 1, wherein the agricultural implement comprises a planter.

6. The closing assembly of claim 1, comprising a plurality of spacers, wherein each spacer of the plurality of spacers is disposed between the bolt and a rotational interface on an inner surface of the opening of a respective arm of the plurality of arms.

7. The closing assembly of claim 6, wherein each spacer is configured to reduce friction between the bolt and the rotational interface of a respective arm.

8. A closing assembly of a row unit for an agricultural implement, comprising:
   a frame configured to support ground-working tools of the row unit;
   a pair of arms coupled to the frame, wherein each arm of the pair of arms is independently rotatable about a common axis;
   a pair of closing discs configured to direct soil into a trench, wherein each closing disc of the pair of closing discs is coupled to a respective one of the pair of arms;
   a pair of coil springs, wherein each coil spring of the pair of coil springs is configured to exert a force on a respective arm, and the force exerted by each coil spring urges a respective closing disc toward a soil surface; and
   a first set of pegs disposed vertically along a first lateral surface of the frame, and a second set of pegs disposed vertically along a second lateral surface of the frame, wherein each of the first and second sets of pegs includes two or more pegs, and each of the first and second sets of pegs is configured to facilitate adjustment of the force exerted on a respective arm via selective engagement of an extension of a respective coil spring with one of the two or more pegs of a respective set of pegs.

9. The closing assembly of claim 8, comprising a bolt coupling the pair of arms to the frame, wherein the bolt extends along the common axis.

10. The closing assembly of claim 9, comprising a pair of spacers, wherein each spacer of the pair of spacers is disposed between the bolt and a rotational interface of a respective arm of the pair of arms.

11. The closing assembly of claim 8, wherein the agricultural implement comprises a planter.

* * * * *